(12) United States Patent
Zhang et al.

(10) Patent No.: US 10,750,201 B2
(45) Date of Patent: Aug. 18, 2020

(54) ENCODING METHOD, DECODING METHOD AND DEVICE FOR VIDEO GLOBAL DISPARITY VECTOR

(71) Applicant: SAMSUNG ELECTRONICS CO., LTD., Suwon-si (KR)

(72) Inventors: Jun Zhang, Beijing (CN); Jie Chen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 16/085,273

(22) PCT Filed: Mar. 15, 2017

(86) PCT No.: PCT/KR2017/002795
§ 371 (c)(1),
(2) Date: Sep. 14, 2018

(87) PCT Pub. No.: WO2017/160078
PCT Pub. Date: Sep. 21, 2017

(65) Prior Publication Data
US 2019/0089979 A1    Mar. 21, 2019

(30) Foreign Application Priority Data
Mar. 15, 2016 (CN) .......................... 2016 1 0148076

(51) Int. Cl.
*H04N 19/172* (2014.01)
*H04N 19/46* (2014.01)
(Continued)

(52) U.S. Cl.
CPC ......... *H04N 19/527* (2014.11); *H04N 19/172* (2014.11); *H04N 19/174* (2014.11);
(Continued)

(58) Field of Classification Search
None
See application file for complete search history.

(56) References Cited

U.S. PATENT DOCUMENTS

| 8,923,400 | B1 | 12/2014 | Alvarez et al. |
| 2007/0025444 | A1 | 2/2007 | Okada et al. |

(Continued)

FOREIGN PATENT DOCUMENTS

WO    2013039348 A1    3/2013

OTHER PUBLICATIONS

International Search Report (PCT/ISA/210 and PCT/ISA/220), issued by International Searching Authority in corresponding International Application No. PCTKR2017/002795 dated Jun. 15, 2017.
(Continued)

*Primary Examiner* — Dave Czekaj
*Assistant Examiner* — Samuel D Fereja
(74) *Attorney, Agent, or Firm* — Sughrue Mion, PLLC

(57) ABSTRACT

The present application discloses an encoding method for global disparity vector. The method includes determining global disparity vector prediction information and a global disparity vector of a current encoding region, and encoding information about the global disparity vector of the current encoding region and writing the information into a bit-stream as required, wherein the information about the global disparity vector of the current encoding region is used to determine the global disparity vector of the current encoding region by a decoder.

8 Claims, 2 Drawing Sheets

(51) Int. Cl.
*H04N 19/527* (2014.01)
*H04N 19/174* (2014.01)
*H04N 19/176* (2014.01)
*H04N 19/184* (2014.01)

(52) U.S. Cl.
CPC ......... *H04N 19/176* (2014.11); *H04N 19/184* (2014.11); *H04N 19/46* (2014.11)

(56) References Cited

U.S. PATENT DOCUMENTS

| | | |
|---|---|---|
| 2014/0078254 A1 | 3/2014 | Lin et al. |
| 2014/0362920 A1 | 12/2014 | Kotaka |
| 2018/0007388 A1* | 1/2018 | Sung .................... H04N 19/597 |

OTHER PUBLICATIONS

Written Opinion (PCT/ISA/237) issued by the International Searching Authority in corresponding International Application No. PCTKR2017/002795 dated Jun. 15, 2017.

* cited by examiner

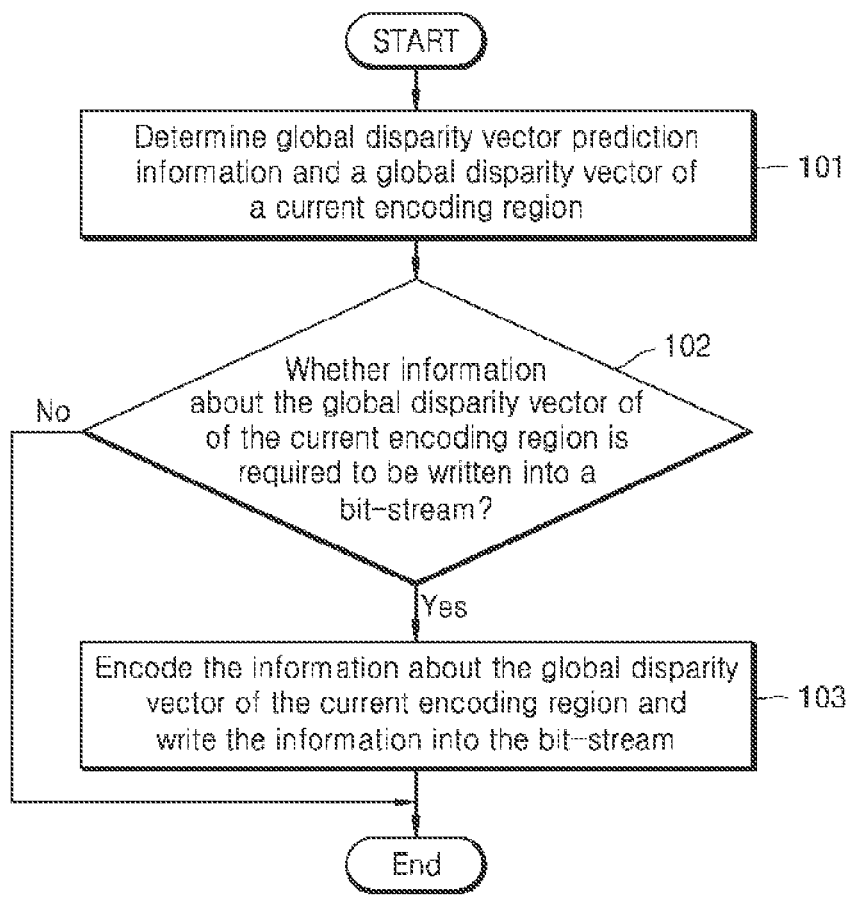
[Fig. 1]

[Fig. 2]
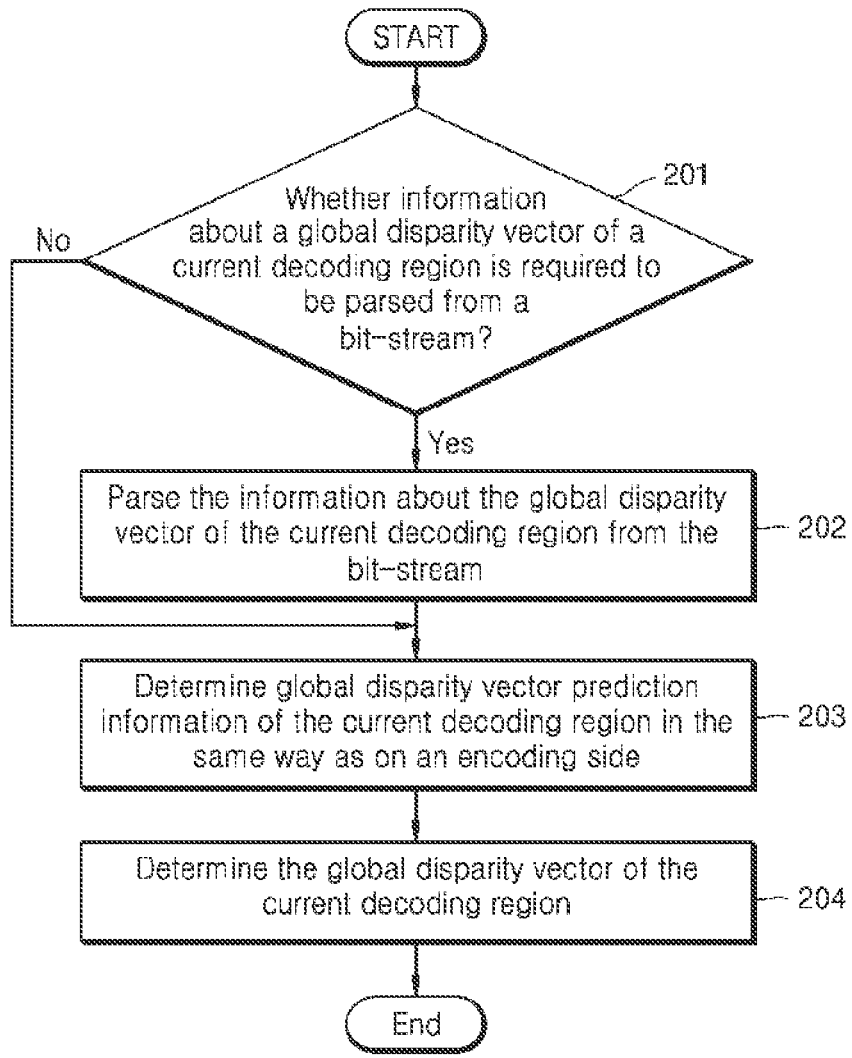
[Fig. 3]
[Fig. 4]
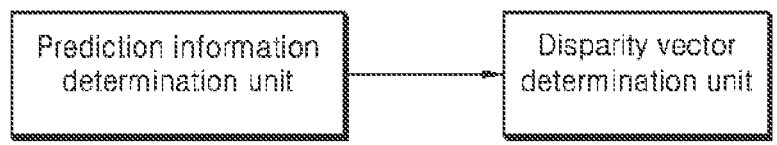

ENCODING METHOD, DECODING METHOD AND DEVICE FOR VIDEO GLOBAL DISPARITY VECTOR

TECHNICAL FIELD

The present disclosure relates to the technical field of video encoding/decoding, and in particular to an encoding method, decoding method and device for a video disparity vector.

BACKGROUND ART

In the multi-viewpoint video encoding, at least one basic viewpoint and one dependent viewpoint are contained. The basic viewpoint is encoded independently, while the dependent viewpoint can be encoded with reference to the basic viewpoint. Different viewpoints are photographed by cameras from different angle of views, so there are disparities between viewpoints. In the multi-viewpoint plus depth video encoding, each viewpoint also comprises at least two layers, i.e., a texture layer and a depth layer.

In the AVS2-3D video coding standard, the disparity value between a dependent viewpoint and a basic viewpoint is expressed by a Global Disparity Vector (GDV) tool. Specifically, for each picture in each layer (the texture layer or the depth layer) in each dependent viewpoint, a two-dimensional GDV is transmitted in the picture header to identify the disparity of the current picture relative to a corresponding picture (having a same display order index) in a corresponding layer of the basic viewpoint. The GDV can be used to search a corresponding encoding block from the corresponding picture for the encoding block in the current picture, so that the inter-view redundancy is eliminated, and the compression efficiency is improved. In the AVS2-3D, the GDV regards a picture as a transmission unit, and each picture transmits a two-dimensional disparity vector integrally. However, this encoding method leads to a larger number of coding bits and a low coding efficiency.

DISCLOSURE

Technical Solution

Accordingly, the present invention has been made to solve the above-mentioned problems, and to provide at least the advantages as described below. An aspect of the present disclosure provides encoding/decoding method and device for for video global disparity vector, whereby the coding efficiency is improved.

DESCRIPTION OF DRAWINGS

FIG. 1 is a flowchart of an encoding method for a global disparity vector according to an exemplary embodiment;

FIG. 2 is a flowchart of a decoding method for a global disparity vector according to an exemplary embodiment;

FIG. 3 is a structural diagram of an encoder according to an exemplary embodiment; and FIG. 4 is a structural diagram of a decoder according to an exemplary embodiment.

BEST MODE

According to an aspect of the present disclosure, there is provided an encoding method for global disparity vector is presented, the method comprising: determining global disparity vector prediction information and a global disparity vector of a current encoding region; and encoding information about the global disparity vector of the current encoding region and writing the information into a bit-stream as required.

According to an aspect of the present disclosure, the information about the global disparity vector of the current encoding region is used to determine the global disparity vector of the current encoding region by a decoder.

According to an aspect of the present disclosure, the encoding region comprises at least one of the following: a picture, a partial picture, a slice, a picture tile, a largest coding unit, a coding unit and a macro block.

According to an aspect of the present disclosure, the determining global disparity vector prediction information and a global disparity vector of a current encoding region comprises: determining a global disparity vector prediction value of a current encoding region according to at least one of the following: global disparity vectors of N1 encoding regions at a same viewpoint which have been encoded prior to the current encoding region, N2 preset vectors, and N3 vectors calculated according to the global disparity vectors of the N1 encoding regions at the same viewpoint which have been encoded prior to the current encoding region, wherein the N1, N2 and N3 are positive integers, and the N1 encoding regions at the same viewpoint are encoding regions which belong to a layer the same as or different from the current encoding region; and determining the global disparity vector of the current encoding region, and According to an aspect of the present disclosure, the encoding information about the global disparity vector of the current encoding region and writing the information into a bit-stream comprises: writing a difference between the global disparity vector of the current encoding region and the global disparity vector prediction value into the bit-stream.

According to an aspect of the present disclosure, the determining global disparity vector prediction information and a global disparity vector of a current encoding region comprises: determining a global disparity vector prediction value of a current encoding region according to at least one of the following: global disparity vectors of N1 encoding regions at a same viewpoint which have been encoded prior to the current encoding region, N2 preset vectors, and N3 vectors calculated according to the global disparity vectors of the N1 encoding regions at the same viewpoint which have been encoded prior to the current encoding region, wherein the N1, N2 and N3 are positive integers, and the N1 encoding regions at the same viewpoint are encoding regions which belong to a layer the same as or different from the current encoding region; and determining the global disparity vector of the current encoding region, and According to an aspect of the present disclosure, the encoding information about the global disparity vector of the current encoding region and writing the information into a bit-stream comprises: writing a flag bit indicative of the absence of difference information into the bit-stream if the global disparity vector of the current encoding region is the same as the global disparity vector prediction value; or otherwise, writing a flag bit indicative of the presence of difference information, and a difference between the global disparity vector of the current encoding region and the global disparity vector prediction value into the bit-stream.

According to an aspect of the present disclosure, the determining global disparity vector prediction information and a global disparity vector of a current encoding region comprises: determining a global disparity vector prediction value of a current encoding region according to at least one of the following: global disparity vectors of N1 encoding regions at a same viewpoint which have been encoded prior to the current encoding region, N2 preset vectors, and N3 vectors calculated according to the global disparity vectors of the N1 encoding regions at a same viewpoint which have been encoded prior to the current encoding region, wherein the N1, N2 and N3 are positive integers, and the N1 encoding regions at the same viewpoint are encoding regions which belong to a layer the same as or different from the current encoding region; and, setting the global disparity vector of the current encoding region as the global disparity vector prediction value, and According to an aspect of the present disclosure, a result of deciding whether the information about the global disparity vector of the current encoding region is required to be written into the bit-stream is NO.

According to an aspect of the present disclosure, the determining global disparity vector prediction information and a global disparity vector of a current encoding region comprises: constructing a list of global disparity vector prediction candidate values, the list containing at least one of the following: global disparity vectors of N1 encoding regions at a same viewpoint which have been encoded prior to the current encoding region, N2 preset vectors, and N3 vectors calculated according to the global disparity vectors of the N1 encoding regions at a same viewpoint which have been encoded prior to the current encoding region; selecting a global disparity vector prediction candidate value from the list as a global disparity vector prediction value of the current encoding region, and recording an index corresponding to this candidate value, wherein the N1, N2 and N3 are positive integers, and the N1 encoding regions at the same viewpoint are encoding regions which belong to a layer the same as or different from the current encoding region; and, determining the global disparity vector of the current encoding region, and According to an aspect of the present disclosure, the encoding information about the global disparity vector of the current encoding region and writing the information into a bit-stream comprises: writing the index of the global disparity vector prediction value, and a difference between the global disparity vector of the current encoding region and the global disparity vector prediction value into the bit-stream.

According to an aspect of the present disclosure, the determining global disparity vector prediction information and a global disparity vector of a current encoding region comprises: constructing a list of global disparity vector prediction candidate values, the list containing at least one of the following: global disparity vectors of N1 encoding regions at a same viewpoint which have been encoded prior to the current encoding region, N2 preset vectors, and N3 vectors calculated according to the global disparity vectors of the N1 encoding regions at a same viewpoint which have been encoded prior to the current encoding region; selecting a global disparity vector prediction candidate value from the list as a global disparity vector prediction value of the current encoding region, and recording an index corresponding to this candidate value, wherein the N1, N2 and N3 are positive integers, and the N1 encoding regions at the same viewpoint are encoding regions which belong to a layer the same as or different from the current encoding region; and, determining the global disparity vector of the current encoding region, and According to an aspect of the present disclosure, the encoding information about the global disparity vector of the current encoding region and writing the information into a bit-stream comprises: writing the index of the global disparity vector prediction value into the bit-stream; writing a flag bit indicative of the absence of difference information into the bit-stream if the global disparity vector of the current encoding region is the same as the global disparity vector prediction value; or otherwise, writing a flag bit indicative of the presence of difference information, and a difference between the global disparity vector of the current encoding region and the global disparity vector prediction value into the bit-stream.

According to an aspect of the present disclosure, the determining global disparity vector prediction information and a global disparity vector of a current encoding region comprises: constructing a list of global disparity vector prediction candidate values, the list containing at least one of the following: global disparity vectors of N1 encoding regions at a same viewpoint which have been encoded prior to the current encoding region, N2 preset vectors, and N3 vectors calculated according to the global disparity vectors of the N1 encoding regions at a same viewpoint which have been encoded prior to the current encoding region; selecting a global disparity vector prediction candidate value from the list as a global disparity vector prediction value of the current encoding region, and recording an index corresponding to this candidate value, wherein the N1, N2 and N3 are positive integers, and the N1 encoding regions at the same viewpoint are encoding regions which belong to a layer the same as or different from the current encoding region; and, setting the global disparity vector of the current encoding region as the global disparity vector prediction value, and According to an aspect of the present disclosure, the encoding information about the global disparity vector of the current encoding region and writing the information into a bit-stream comprises: writing the index of the global disparity vector prediction value into the bit-stream.

According to an aspect of the present disclosure, there is provided an encoder comprising: a information determination unit is configured to determine global disparity vector prediction information and a global disparity vector of a current encoding region; and a writing unit is configured to decide whether information about the global disparity vector of the current encoding region is required to be written into a bit-stream, if it is, then encode the information about the global disparity vector of the current encoding region and write the information into the bit-stream, the information about the global disparity vector of the current encoding region being used to determine the global disparity vector of the current encoding region by a decoder.

According to an aspect of the present disclosure, there is provided a decoding method for global disparity vector, the method comprising: determining global disparity vector prediction information of a current decoding region in the same way as on an encoding side; and determining a global disparity vector of the current decoding region according to the global disparity vector prediction information.

According to an aspect of the present disclosure, there is provided the decoding method further comprising: after determining the global disparity vector of the current decoding region, setting a global disparity vector of a corresponding decoding region in a layer different from the current decoding region at a same viewpoint as the global disparity vector of the current decoding region.

According to an aspect of the present disclosure, the decoding region comprises at least one of the following: a picture, a partial picture, a slice, a picture tile, a largest coding unit, an coding unit and a macro block.

According to an aspect of the present disclosure, there is provided the decoding method further comprising: parsing, from a bit-stream, a difference between the global disparity vector of the current decoding region and a global disparity vector prediction value.

According to an aspect of the present disclosure, the determining global disparity vector prediction information of a current decoding region in the same way as on an encoding side comprises: determining the global disparity vector prediction value of the current decoding region in the same way as on the encoding side according to at least one of the following: global disparity vectors of N1 decoding regions at a same viewpoint which have been decoded prior to the current decoding region, N2 preset vectors, and N3 vectors calculated according to the global disparity vectors of the N1 decoding regions at the same viewpoint which have been decoded prior to the current decoding region, wherein the N1, N2 and N3 are positive integers, and the N1 decoding regions at the same viewpoint are decoding regions which belong to a layer the same as or different from the current decoding region.

According to an aspect of the present disclosure, the determining a global disparity vector of the current decoding region according to the global disparity vector prediction information comprises: determining the global disparity vector of the current decoding region as a sum of the global disparity vector prediction value and the difference.

According to an aspect of the present disclosure, there is provided the decoding method further comprising: parsing a flag bit from a bit-stream, and parsing, from the bit-stream, a difference between the global disparity vector of the current decoding region and a global disparity vector prediction value if a result of parsing the flag bit indicates the presence of difference information.

According to an aspect of the present disclosure, the determining global disparity vector prediction information of a current decoding region in the same way as on an encoding side comprises: determining the global disparity vector prediction value of the current decoding region in the same way as on the encoding side according to at least one of the following: global disparity vectors of N1 decoding regions at a same viewpoint which have been decoded prior to the current decoding region, N2 preset vectors, and N3 vectors calculated according to the global disparity vectors of the N1 decoding regions at the same viewpoint which have been decoded prior to the current decoding region, wherein the N1, N2 and N3 are positive integers, and the N1 decoding regions at the same viewpoint are decoding regions which belong to a layer the same as or different from the current decoding region, and According to an aspect of the present disclosure, the determining a global disparity vector of the current decoding region according to the global disparity vector prediction information comprises: determining the global disparity vector of the current decoding region as the global disparity vector prediction value if the result of parsing the flag bit indicates the absence of difference information; or otherwise, determining the global disparity vector of the current decoding region as a sum of the global disparity vector prediction value and the difference.

According to an aspect of the present disclosure, the determining global disparity vector prediction information of a current decoding region in the same way as on an encoding side comprises: determining a global disparity vector prediction value of the current decoding region in the same way as on the encoding side according to at least one of the following: global disparity vectors of N1 decoding regions at a same viewpoint which have been decoded prior to the current decoding region, N2 preset vectors, and N3 vectors calculated according to the global disparity vectors of the N1 decoding regions at the same viewpoint which have been decoded prior to the current decoding region, wherein the N1, N2 and N3 are positive integers, and the N1 decoding regions at the same viewpoint are decoding regions which belong to a layer the same as or different from the current decoding region.

According to an aspect of the present disclosure, the determining a global disparity vector of the current decoding region according to the global disparity vector prediction information comprises: determining the global disparity vector of the current decoding region as the global disparity vector prediction value.

According to an aspect of the present disclosure, there is provided the decoding method further comprising: parsing, from a bit-stream, an index of a global disparity vector prediction value and a difference between the global disparity vector of the current decoding region and the global disparity vector prediction value.

According to an aspect of the present disclosure, the determining global disparity vector prediction information of a current decoding region in the same way as on an encoding side comprises: determining the global disparity vector prediction value of the current decoding region according to the parsed index and a list of global disparity vector prediction candidate values which is the same as that on the encoding side.

According to an aspect of the present disclosure, the determining a global disparity vector of the current decoding region according to the global disparity vector prediction information comprises: determining the global disparity vector of the current decoding region as a sum of the global disparity vector prediction value and the difference.

According to an aspect of the present disclosure, there is provided the decoding method further comprising: parsing, from a bit-stream, an index of a global disparity vector prediction value and a flag bit, and parsing, from the bit-stream, a difference between the global disparity vector of the current decoding region and the global disparity vector prediction value if a result of parsing the flag bit indicates the presence of difference information.

According to an aspect of the present disclosure, the determining global disparity vector prediction information of a current decoding region in the same way as on an encoding side comprises: determining the global disparity vector prediction value of the current decoding region according to the parsed index and a list of global disparity vector prediction candidate values which is the same as that on the encoding side.

According to an aspect of the present disclosure, the determining a global disparity vector of the current decoding region according to the global disparity vector prediction information comprises: determining the global disparity vector of the current decoding region as the global disparity vector prediction value if the result of parsing the flag bit indicates the absence of difference information; and, determining the global disparity vector of the current decoding region as a sum of the global disparity vector prediction value and the difference if the result of parsing the flag bit indicates the presence of difference information.

According to an aspect of the present disclosure, there is provided the decoding method further comprising: parsing, from a bit-stream, an index of a global disparity vector prediction value.

According to an aspect of the present disclosure, the determining global disparity vector prediction information of a current decoding region in the same way as on an encoding side comprises: determining the global disparity vector prediction value of the current decoding region according to the parsed index and a list of global disparity vector prediction candidate values which is the same as that on the encoding side.

According to an aspect of the present disclosure, the determining a global disparity vector of the current decoding region according to the global disparity vector prediction information comprises: determining the global disparity vector of the current decoding region as the global disparity vector prediction value.

According to an aspect of the present disclosure, there is provided a decoder comprising: a prediction information determination unit configured to determine global disparity vector prediction information of a current decoding region in the same way as on an encoding side; and a disparity vector determination unit configured to determine a global disparity vector of the current decoding region according to the information provided by the prediction information determination unit.

MODE FOR INVENTION

To make the objectives, technical solutions and advantages of the present application understood clearer, the present application will be further described below in details by embodiments with reference to the accompanying drawings.

In the AVS2-3D, for each picture in each layer in a dependent viewpoint, a two-dimensional global disparity vector is integrally encoded and transmitted to identify a disparity of the current picture relative to a corresponding picture in the basic viewpoint. The advantage of this encoding method is intuitive and simple. However, this encoding method does not utilize a multiple of correlations in a video, and a two-dimensional vector is integrally encoded for each picture, so that the number of encoding bits is increased and the encoding efficiency is reduced. If the correlations in a video can be utilized, the encoding overhead for a global disparity vector can be further reduced, and the encoding efficiency can be improved.

In the present disclosure, the correlations in a video are utilized to reduce the number of encoding bits for a global disparity vector, so that the video compression efficiency is further improved. Specifically, in the present disclosure, by utilizing the temporal correlation, spatial correlation and the inter-layer correlation in a video, and with reference to the global disparity vectors of other encoding/decoding regions which have been encoded/decoded, a global disparity vector of the current encoding region is predictively encoded/decoded.

FIG. 1 is a schematic flowchart of an encoding method for a global disparity vector according to the present application. The method comprises the following steps.

Step 101: Global disparity vector prediction information and a global disparity vector of a current encoding region are determined.

Step 102: It is decided whether information about the global disparity vector of the current encoding region is required to be written into a bit-stream; if it is required, step 103 is executed; and, if not, this method ends.

Step 103: The information about the global disparity vector of the current encoding region is encoded and written into a bit-stream as required, wherein the information about the global disparity vector of the current encoding region is used to determine the global disparity vector of the current encoding region by a decoder.

FIG. 2 is a decoding method for a global disparity vector according to the present application. The method comprises the following steps.

Step 201: It is decided whether information about a global disparity vector of a current decoding region is required to be parsed from a bit-stream; if so, step 202 is executed; and, if not, step 203 is executed.

Step 202: The information about the global disparity vector of the current decoding region is parsed from the bit-stream.

Step 203: Global disparity vector prediction information of the current decoding region is determined in the same way as on an encoding side.

Step 204: The global disparity vector of the current decoding region is determined according to the global disparity vector prediction information.

In some embodiments, the chronological order of step 201 and step 203 is not strictly required, which will be described by specific embodiments. Moreover, in some embodiments, instead of executing the deciding in step 201 and the parsing in step 202, step 203 can be directly executed to determine the global disparity vector prediction information of the current decoding region and then use the global disparity vector prediction information of the current decoding region as the global disparity vector of the current decoding region.

The technical solutions of the present application will be further described below in details by several preferred embodiments.

Embodiment 1

This embodiment provides an encoding method for a global disparity vector by an encoder. The method comprises the following steps.

Step 1: Global disparity vector prediction information and a global disparity vector of a current encoding region are determined.

Specifically, as one possible implementation, the current encoding region is a picture. In other words, global disparity vector prediction information and a global disparity vector of the current picture are determined in this step, where the picture can be a texture layer picture or a depth layer picture. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The encoder determines a global disparity vector prediction value of the current picture by a certain method with reference to at least one of the following: global disparity vectors of N1 pictures at a same viewpoint (which can belong to a different layer) which have been encoded prior to the current picture, N2 preset vectors, and N3 vectors calculated according to the global disparity vectors of the N1 pictures at the same viewpoint which have been encoded prior to the current picture, wherein the N1, N2 and N3 are positive integers. The method comprises but is not limited to: directly using a certain vector among the referred vectors as the global disparity vector prediction value of the current picture, for example, directly using the global disparity vector of a certain picture among the N1 pictures as the global disparity vector prediction value of the current picture; or calculating an average value, a maximum value, a minimum value, a median value or other characteristic values of the global disparity vectors of the N1 pictures as the global disparity vector prediction value of the current picture. In the present application, the N1 pictures at the same viewpoint which have been encoded prior to the current picture and whose global disparity vectors are referred by encoder can contain pictures in a layer the same as the current picture, or pictures in a layer different from the current picture. For example, assumed that a picture to be encoded currently is a texture layer picture, global disparity vectors of N1 texture layer pictures or depth layer pictures at a same viewpoint which have been encoded prior to the current picture can be referred to determine a global disparity vector prediction value of the texture layer picture to be encoded currently; or, global disparity vectors of N1 texture layer pictures in combination with depth layer pictures can also be referred to determine a global disparity vector prediction value of the texture layer picture to be encoded currently. Otherwise, the same is applicable to the depth layer pictures. In addition, the present application can perform processing on the current encoding region only, and for corresponding encoding regions at a same viewpoint which belong to a layer different from the current encoding region, the result of calculation of the current encoding region processed by the present disclosure is directly used. The above description is applicable to other embodiments in the present application and will not be repeated.

The encoder determines a global disparity vector of the current picture. Here, the global disparity vector of the current picture can be determined by various possible methods in the prior art.

Step 2: Information about the global disparity vector of the current encoding region is encoded and written into a bit-stream.

Information about the global disparity vector of the current picture is written into a bit-stream, according to the global disparity vector prediction information and the global disparity vector of the current picture determined in the step 1.

Specifically, as one possible implementation, a difference between the global disparity vector of the current picture and the global disparity vector prediction value is written into a bit-stream. In this step, it is possible to write only the difference between the global disparity vector of the current picture and the global disparity vector prediction value into the bit-stream. For example, assumed that the current picture is a texture layer picture, only the difference between the global disparity vector of the current picture and the global disparity vector prediction value of the current picture is written; and, on the decoding side, after the global disparity vector of the current picture has been determined, the global disparity vector of the current picture is directly used as a global disparity vector of the corresponding depth layer picture of the same viewpoint. In this step, it is also possible to write a difference between a corresponding global disparity vector and the global disparity vector prediction value into a bit-stream, respectively, for a texture layer and a depth layer at a same viewpoint. In other words, two layers at a same viewpoint can perform corresponding processing respectively and independently, and two differences are transmitted. The above description is applicable to other embodiments of the present application, and decoding is performed on the decoding side in the same way as on the encoding side and will not be repeated.

In this embodiment, in addition to a picture, the encoding region can also be a part of a picture, for example, a partial picture, a slice, a picture tile, a largest coding unit, a coding unit, a macro block or more.

Embodiment 2

This embodiment provides an encoding method for a global disparity vector by an encoder. The method comprises the following steps.

Step 1: Global disparity vector prediction information and a global disparity vector of a current encoding region are determined.

Specifically, as a possible implementation, the current encoding region is a picture. In other words, global disparity vector prediction information and a global disparity vector of the current picture are determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The encoder determines a global disparity vector prediction value of the current picture by a certain method with reference to at least one of the following: global disparity vectors of N1 pictures at a same viewpoint (which can belong to a different layer) which have been encoded prior to the current picture, N2 preset vectors, and N3 vectors calculated according to the global disparity vectors of the N1 pictures at the same viewpoint which have been encoded prior to the current picture, wherein the N1, N2 and N3 are positive integers. The method comprises but is not limited to: directly using a certain vector among the referred vectors as the global disparity vector prediction value of the current picture, for example, directly using the global disparity vector of a certain picture among the N1 pictures as the global disparity vector prediction value of the current picture; or calculating an average value, a maximum value, a minimum value, a median value or other characteristic values of the global disparity vectors of the N1 pictures to serve as the global disparity vector prediction value of the current picture.

The encoder determines the global disparity vector of the current picture by a certain method. For example, the global disparity vector of the current picture can be determined by various possible methods in the prior art.

Step 2: Information about the global disparity vector of the current encoding region is encoded and written into a bit-stream.

Information about the global disparity vector of the current picture is written into a bit-stream according to the global disparity vector prediction value and the global disparity vector of the current picture determined in the step 1.

Specifically, as one possible implementation:
a flag bit indicative of the absence of difference information is written into the bit-stream if the global disparity vector of the current picture is the same as the global disparity vector prediction value; and, a flag bit indicative of the presence of difference information and a difference between the global disparity vector of the current picture and the global disparity vector prediction value are written into the bit-stream if the global disparity vector of the current picture is different from the global disparity vector prediction value.

In this embodiment, in addition to a picture, the encoding region can also be a part of a picture, for example, a partial picture, a slice, a picture tile, a largest coding unit, a coding unit, a macro block or more.

Embodiment 3

This embodiment provides an encoding method for a global disparity vector by an encoder. The method comprises the following steps.

Step 1: Global disparity vector prediction information and a global disparity vector of a current encoding region are determined.

Specifically, as one possible implementation, the current encoding region is a picture. In other words, global disparity vector prediction information and a global disparity vector of the current picture are determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The encoder determines a global disparity vector prediction value of the current picture by a certain method with reference to at least one of the following: global disparity vectors of N1 pictures at a same viewpoint (which can belong to a different layer) which have been encoded prior to the current picture, N2 preset vectors, and N3 vectors calculated according to the global disparity vectors of the N1 pictures at the same viewpoint which have been encoded prior to the current picture, wherein the N1, N2 and N3 are positive integers. The method comprises but is not limited to: directly using a certain vector among the referred vectors as the global disparity vector prediction value of the current picture, for example, directly using the global disparity vector of a certain picture among the N1 pictures as the global disparity vector prediction value of the current picture; or calculating an average value, a maximum value, a minimum value, a median value or other characteristic values of the global disparity vectors of the N1 pictures to serve as the global disparity vector prediction value of the current picture.

The encoder sets the global disparity vector of the current picture to be equal to the global disparity vector prediction value.

In this embodiment, as the global disparity vector is the same as the global disparity vector prediction value, it is not required to write any information about the global disparity vector of the current encoding region into the bit-stream.

In this embodiment, in addition to a picture, the encoding region can also be a part of a picture, for example, a partial picture, a slice, a picture tile, a largest coding unit, a coding unit, a macro block or more.

Embodiment 4

This embodiment provides an encoding method for a global disparity vector by an encoder. The method comprises the following steps.

Step 1: Global disparity vector prediction information and a global disparity vector of a current encoding region are determined.

Specifically, as one possible implementation, the current encoding region is a picture. In other words, global disparity vector prediction information and a global disparity vector of the current picture are determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The encoder constructs a list of global disparity vector prediction candidate values of the current picture with reference to at least one of the following: global disparity vectors of N1 pictures at a same viewpoint (which can belong to a different layer) which have been encoded prior to the current picture, N2 preset vectors, and N3 vectors calculated according to the global disparity vectors of the N1 pictures at the same viewpoint which have been encoded prior to the current picture, wherein the N1, N2 and N3 are positive integers. The encoder selects a candidate vector from the list of global disparity vector prediction candidate values as a global disparity vector prediction value, and records a position index of the candidate vector in the list. The encoder determines the global disparity vector of the current picture by a certain method. For example, the global disparity vector of the current picture can be determined by various possible methods in the prior art.

Step 2: Information about the global disparity vector of the current encoding region is encoded and written into a bit-stream.

Information about the global disparity vector of the current picture is written into a bit-stream according to the global disparity vector prediction information and the global disparity vector of the current picture determined in the step 1.

Specifically, as one possible implementation:

the position index determined in the step 1 and the difference between the global disparity vector of the current picture determined in the step 101 and the global disparity vector prediction value are written into the bit-stream.

In this embodiment, in addition to a picture, the encoding region can also be a part of a picture, for example, a partial picture, a slice, a picture tile, a largest coding unit, a coding unit, a macro block or more.

Embodiment 5

This embodiment provides an encoding method for a global disparity vector by an encoder. The method comprises the following steps.

Step 1: Global disparity vector prediction information and a global disparity vector of a current encoding region are determined.

Specifically, as one possible implementation, the current encoding region is a picture. In other words, global disparity vector prediction information and a global disparity vector of the current picture are determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The encoder constructs a list of global disparity vector prediction candidate values of the current picture with reference to at least one of the following: global disparity vectors of N1 pictures at a same viewpoint (which can belong to a different layer) which have been encoded prior to the current picture, N2 preset vectors, and N3 vectors calculated according to the global disparity vectors of the N1 pictures at the same viewpoint which have been encoded prior to the current picture, wherein the N1, N2 and N3 are positive integers. The encoder selects a candidate vector from the list of global disparity vector prediction candidate values as a global disparity vector prediction value, and records a position index of the candidate vector in the list. The encoder determines the global disparity vector of the current picture by a certain method. For example, the global disparity vector of the current picture can be determined by various possible methods in the prior art.

Step 2: Information about the global disparity vector of the current encoding region is encoded and written into a bit-stream.

Information about the global disparity vector of the current picture is written into a bit-stream according to the global disparity vector prediction information and the global disparity vector of the current picture determined in the step 1.

Specifically, as one possible implementation:
the position index determined in the step 1 is written into the bit-stream; a flag bit indicative of the absence of difference information is written into the bit-stream if the global disparity vector of the current picture is the same as the global disparity vector prediction value; and, a flag bit indicative of the presence of difference information and a difference between the global disparity vector of the current picture and the global disparity vector prediction value are written into the bit-stream if the global disparity vector of the current picture is different from the global disparity vector prediction value.

In this embodiment, in addition to a picture, the encoding region can also be a part of a picture, for example, a partial picture or a slice, a picture tile, a largest coding unit, a coding unit, a macro block or more.

Embodiment 6

This embodiment provides an encoding method for a global disparity vector by an encoder. The method comprises the following steps.

Step 1: Global disparity vector prediction information and a global disparity vector of a current encoding region are determined.

Specifically, as one possible implementation, the current encoding region is a picture. In other words, global disparity vector prediction information and a global disparity vector of the current picture are determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The encoder constructs a list of global disparity vector prediction candidate values of the current picture with reference to at least one of the following: global disparity vectors of N1 pictures at a same viewpoint (which can belong to a different layer) which have been encoded prior to the current picture, N2 preset vectors, and N3 vectors calculated according to the global disparity vectors of the N1 pictures at the same viewpoint which have been encoded prior to the current picture, wherein the N1, N2 and N3 are positive integers. The encoder selects a candidate vector from the list of global disparity vector prediction candidate values as a global disparity vector prediction value, and records a position index of the candidate vector in the list.

The encoder sets the global disparity vector of the current picture to be equal to the global disparity vector prediction value.

Step 2: Information about the global disparity vector of the current encoding region is encoded and written into a bit-stream.

Information about the global disparity vector of the current picture is written into a bit-stream, according to the global disparity vector prediction information and the global disparity vector of the current picture determined in the step 1.

Specifically, as one possible implementation:
the position index determined in the step 1 is written into the bit-stream.

In this embodiment, in addition to a picture, the encoding region can also be a part of a picture for example, a partial picture, a slice, a picture tile, a largest coding unit, a coding unit, a macro block or more.

Embodiment 7

This embodiment provides a decoding method for a global disparity vector by a decoder. The method comprises the following steps.

Step 1: Global disparity vector prediction information of a current decoding region is determined in the same way as on an encoding side.

Specifically, as one possible implementation, the current decoding region is a picture. In other words, global disparity vector prediction information of the current picture is determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The decoder determines a global disparity vector prediction value of the current picture by a certain method with reference to at least one of the following: global disparity vectors of N1 pictures at a same viewpoint (which can belong to a different layer) which have been decoded prior to the current picture, N2 preset vectors, and N3 vectors calculated according to the global disparity vectors of the N1 decoding regions at the same viewpoint which have been decoded prior to the current decoding region, wherein the N1, N2 and N3 are positive integers. The method comprises but is not limited to: directly using a certain vector among the referred vectors as the global disparity vector prediction value of the current picture, for example, directly using the global disparity vector of a particular picture among the N1 pictures as the global disparity vector prediction value of the current picture; or calculating an average value, a maximum value, a minimum value, a median value or other characteristic values of the global disparity vectors of the N1 pictures as the global disparity vector prediction value of the current picture. As described in Embodiment 1, the N1 pictures at the same viewpoint which have been decoded prior to the current picture and whose global disparity vectors are referred by decoder can contain pictures in a layer the same as the current picture, or pictures in a layer different from the current picture. For example, assumed that a picture is to be decoded currently is a texture layer picture, global disparity vectors of N1 texture layer pictures or depth layer pictures at a same viewpoint which have been decoded prior to the current picture can be referred to determine a global disparity vector prediction value of the texture layer picture to be decoded currently; or, global disparity vectors of N1 texture layer pictures in combination with depth layer pictures can also be referred to determine a global disparity vector prediction value of the texture layer picture to be decoded currently. Otherwise, the same is applicable to the depth layer pictures.

Step 2: Information about a global disparity vector of the current decoding region is parsed from a bit-stream.

Specifically, as one possible implementation, a difference between the global disparity vector of the current picture and the global disparity vector prediction value is parsed from the bit-stream.

Step 3: The global disparity vector of the current decoding region is determined in the same way as on the encoding side, according to the global disparity vector prediction information of the current decoding region and the information about the global disparity vector of the current decoding region.

Specifically, as one possible implementation, the global disparity vector prediction value determined in the step 1 and the difference parsed in the step 2 are added together to obtain the global disparity vector of the current picture.

As described in embodiment 1, after determining the global disparity vector of the current decoding region, setting a global disparity vector of a corresponding decoding region in a layer different from the current decoding region at a same viewpoint as the global disparity vector of the current decoding region. The above description is applicable to other embodiments in the present application and will not be repeated.

In this embodiment, in addition to a picture, the decoding region can also be a part of a picture, for example, a partial picture, a slice, a picture tile, a largest coding unit, a coding unit, a macro block or more.

The chronological order of step 1 and step 2 is not strictly required in this embodiment.

Embodiment 8

This embodiment provides a decoding method for a global disparity vector by a decoder. The method comprises the following steps.

Step 1: Global disparity vector prediction information of a current decoding region is determined in the same way as on an encoding side.

Specifically, as one possible implementation, the current decoding region is a picture. In other words, global disparity vector prediction information of the current picture is determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The decoder determines a global disparity vector prediction value of the current picture by a certain method with reference to at least one of the following: global disparity vectors of N1 pictures at a same viewpoint (which can belong to a different layer) which have been decoded prior to the current picture, N2 preset vectors, and N3 vectors calculated according to the global disparity vectors of the N1 decoding regions at the same viewpoint which have been decoded prior to the current decoding region, wherein the N1, N2 and N3 are positive integers. The method comprises but is not limited to: directly using a certain vector among the referred vectors as the global disparity vector prediction value of the current picture, for example, directly using the global disparity vector of a particular picture among the N1 pictures as the global disparity vector prediction value of the current picture; or calculating an average value, a maximum value, a minimum value, a median value or other characteristic values of the global disparity vectors of the N1 pictures as the global disparity vector prediction value of the current picture.

Step 2: Information about a global disparity vector of the current decoding region is parsed from a bit-stream.

Specifically, as one possible implementation: a flag bit is read from a bit-stream; this step ends if the flag bit indicates that difference information between the global disparity vector of the current picture and the global disparity vector prediction value is not written into the bit-stream; and, the difference is parsed if the flag bit indicates that difference information between the global disparity vector of the current picture and the global disparity vector prediction value is written into the bit-stream.

Step 3: The global disparity vector of the current decoding region is determined in the same way as on the encoding side, according to the global disparity vector prediction information of the current decoding region and the information about the global disparity vector of the current decoding region.

Specifically, as one possible implementation: the global disparity vector of the current picture is set as the global disparity vector prediction value determined in the step 1 if the flag bit in step 2 indicates that difference information between the global disparity vector of the current picture and the global disparity vector prediction value is not written into the bit-stream; or otherwise, the global disparity vector of the current picture is set as a sum of the global disparity vector prediction value determined in the step 1 and the difference parsed in the step 2.

In this embodiment, in addition to a picture, the decoding region can also be a part of a picture, for example, a partial picture, a slice, a picture tile, a largest coding unit, a coding unit, a macro block or more. The chronological order of step 1 and step 2 is not strictly required in this embodiment.

Embodiment 9

This embodiment provides a decoding method for a global disparity vector by a decoder. The method comprises the following steps.

Step 1: Global disparity vector prediction information of a current decoding region is determined in the same way as on an encoding side.

Specifically, as one possible implementation, the current decoding region is a picture. In other words, global disparity vector prediction information of the current picture is determined in this step. The picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The decoder determines a global disparity vector prediction value of the current picture by a certain method with reference to at least one of the following: global disparity vectors of N1 pictures at a same viewpoint (which can belong to a different layer) which have been decoded prior to the current picture, N2 preset vectors, and N3 vectors calculated according to the global disparity vectors of the N1 decoding regions at the same viewpoint which have been decoded prior to the current decoding region, wherein the N1, N2 and N3 are positive integers. The method comprises but is not limited to: directly using a certain vector among the referred vectors as the global disparity vector prediction value of the current picture, for example, directly using the global disparity vector of a particular picture among the N1 pictures as the global disparity vector prediction value of the current picture; or calculating an average value, a maximum value, a minimum value, a median value or other characteristic values of the global disparity vectors of the N1 pictures as the global disparity vector prediction value of the current picture.

Step 2: A global disparity vector of a current decoding region is determined in the same way as on the encoding side, according to the global disparity vector prediction information of the current decoding region.

Specifically, as one possible implementation, the global disparity vector of the current picture is set as the global disparity vector prediction value determined in the step 1.

In this embodiment, in addition to a picture, the decoding region can also be a part of a picture, for example, a partial picture, a slice, a picture tile, a largest coding unit, a coding unit, a macro block or more.

The chronological order of step 1 and step 2 is not strictly required in this embodiment.

In this embodiment, if texture layer decoding is performed first and followed by depth layer decoding, after a global disparity vector of a texture layer picture is obtained, the global disparity vector can be directly used as a global disparity vector of a depth layer picture at a same viewpoint; in contrast, if depth layer decoding is performed first and followed by texture layer decoding, after a global disparity vector of a depth layer picture is obtained, the global disparity vector can be directly used as a global disparity vector of a texture layer picture at a same viewpoint.

Embodiment 10

This embodiment provides a decoding method for a global disparity vector by a decoder. The method comprises the following steps.

Step 1: Information about a global disparity vector of a current decoding region is parsed from a bit-stream.

Specifically, as one possible implementation, the current decoding region is a picture, and the picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The decoder parses, from the bit-stream, a position index and a difference between the global disparity vector of the current picture and a global disparity vector prediction value.

Step 2: Global disparity vector prediction information of the current decoding region is determined in the same way as on an encoding side.

Specifically, as one possible implementation, global disparity vector prediction information of the current picture is determined in this step. According to a list of global disparity vector prediction candidate values which is the same as that on the encoding side, the decoder sets the global disparity vector prediction value of the current picture as a vector, whose position index is the index in the step 1, in the list of global disparity vector prediction candidate values. The operation of constructing the list of global disparity vector prediction candidate values can also be performed prior to the step 1. In the present application, the decoder constructs the list of global disparity vector prediction candidate values in the same way as the encoder, which will not be repeated here.

Step 3: The global disparity vector of the current decoding region is determined in the same way as on the encoding side, according to the global disparity vector prediction information of the current decoding region and the information about the global disparity vector of the current decoding region.

Specifically, as one possible implementation, the difference obtained in the step 1 and the global disparity vector prediction value obtained in the step 2 are added together to obtain the global disparity vector of the current picture.

In this embodiment, in addition to a picture, the decoding region can also be a part of a picture, for example, a partial picture, a slice, a picture tile, a largest coding unit, a coding unit, a macro block or more.

Embodiment 11

This embodiment provides a decoding method for a global disparity vector by a decoder. The method comprises the following steps.

Step 1: Information about a global disparity vector of a current decoding region is parsed from a bit-stream.

Specifically, as one possible implementation, the current decoding region is a picture, and the picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The decoder parses a position index from the bit-stream, and reads a flag bit from the bit-stream; this step ends if the flag bit indicates that difference information between the global disparity vector of the current picture and the global disparity vector prediction value is not written into the bit-stream; and, the difference is parsed if the flag bit indicates that difference information between the global disparity vector of the current picture and the global disparity vector prediction value is written into the bit-stream.

Step 2: Global disparity vector prediction information of the current decoding region is determined in the same way as on an encoding side.

Specifically, as one possible implementation, global disparity vector prediction information of the current picture is determined in this step. According to a list of global disparity vector prediction candidate values which is the same as that on the encoding side, the decoder sets the global disparity vector prediction value of the current picture as a vector, whose position index is the index in the step 1, in the list of global disparity vector prediction candidate values. The operation of constructing the list of global disparity vector prediction candidate values can also be performed prior to the step 1.

Step 3: The global disparity vector of the current decoding region is determined in the same way as on the encoding side, according to the global disparity vector prediction information of the current decoding region and the information about the global disparity vector of the current decoding region.

Specifically, as one possible implementation:

the global disparity vector of the current picture is set equal to the global disparity vector prediction value determined in the step 2 if the flag bit in step 1 indicates that difference information between the global disparity vector of the current picture and the global disparity vector prediction value is not written into the bit-stream; or otherwise, the global disparity vector of the current picture is set as a sum of the difference parsed in the step 1 and the global disparity vector prediction value determined in the step 2.

In this embodiment, in addition to a picture, the decoding region can also be a part of a picture, for example, a partial picture, a slice, a picture tile, a largest coding unit, a coding unit, a macro block or more.

Embodiment 12

This embodiment provides a decoding method for a global disparity vector by a decoder. The method comprises the following steps.

Step 1: Information about a global disparity vector of a current decoding region is parsed from a bit-stream.

As one possible implementation, the current decoding region is a picture, and the picture may be an inter-frame coding picture, a unidirectional inter-frame coding picture, a bidirectional inter-frame coding picture, a dual-hypothesis inter-frame coding picture, an inter-view inter-frame coding picture, a dependent viewpoint picture, a dependent viewpoint inter-frame coding picture, a texture inter-frame coding picture, a depth inter-frame coding picture or more. The decoder parses a position index from the bit-stream.

Step 2: Global disparity vector prediction information of the current decoding region is determined in the same way as on an encoding side.

Specifically, as one possible implementation, global disparity vector prediction value information of the current picture is determined in this step. According to a list of global disparity vector prediction candidate values which is the same as that on the encoding side, the decoder sets the global disparity vector prediction value of the current picture as a vector, whose position index is the index in the step 1, in the list of global disparity vector prediction candidate values. The operation of constructing the list of global disparity vector prediction candidate values can also be performed prior to the step 1.

Step 3: The global disparity vector of the current decoding region is determined in the same way as on the encoding side, according to the global disparity vector prediction information of the current decoding region and the information about the global disparity vector of the current decoding region.

Specifically, as one possible implementation, the global disparity vector of the current picture is set to be equal to the global disparity vector prediction value determined in the step 2.

In this embodiment, in addition to a picture, the decoding region can also be a part of a picture, for example a partial picture, a slice, a picture tile, a largest coding unit, a coding unit, a macro block or more.

In this embodiment, if texture layer decoding is performed first and followed by depth layer decoding, after a global disparity vector of a texture layer picture is obtained, the global disparity vector can be directly used as a global disparity vector of a depth layer picture at a same viewpoint; in contrast, if depth layer decoding is performed first and followed by texture layer decoding, after a global disparity vector of a depth layer picture is obtained, the global disparity vector can be directly used as a global disparity vector of a texture layer picture at a same viewpoint.

Embodiment 13

FIG. 3 is a structural diagram of an encoder according to Embodiment 13 of the present disclosure. The encoder comprises an information determination unit and a writing unit, wherein:

The information determination unit is configured to determine global disparity vector prediction information and a global disparity vector of a current encoding region. A specific execution method comprises but is not limited to step 1 in Embodiments 1 to 6 of the present disclosure.

The writing unit is configured to, according to the global disparity vector and global disparity vector prediction information of the current encoding region provided by the information determination unit, decide whether information about the global disparity vector of the current encoding region is required to be written into a bit-stream, and if it is required, then encode the information about the global disparity vector of the current encoding region and write the information into the bit-stream, the information about the global disparity vector of the current encoding region being used to determine the global disparity vector of the current encoding region by a decoder. The writing unit can specifically execute, but is not limited to, step 2 in Embodiments 1 to 6 of the present disclosure.

Embodiment 14

FIG. 4 is a structural diagram of a decoder according to Embodiment 14 of the present disclosure. The decoder comprises a prediction information determination unit and a disparity vector determination unit, wherein:

the prediction information determination unit is configured to determine global disparity vector prediction information of a current decoding region in the same way as on an encoding side; and the disparity vector determination unit is configured to determine a global disparity vector of the current decoding region according to the information provided by the prediction information determination unit.

With the present disclosure, without the necessity of integrally encoding and transmitting a global disparity vector for each encoding region, it is only required to determine a global disparity vector prediction value with reference to the global disparity vectors of other encoding regions which have been encoded and then encode and transmit difference information between an actual global disparity vector of the current encoding region and the global disparity vector prediction value. As temporally neighboring pictures and corresponding inter-layer pictures in a video are highly similar in contents, their global disparity vectors are approximate, and the transmitted difference is close to 0, so that the number of encoding bits can be reduced and the compression efficiency can be improved.

The preceding description merely shows preferred embodiments of the present application and is not intended to limit the present application. Any modification, equivalent replacement or improvement made within the spirit and principle of the present application shall fall into the protection scope of the present application.

The invention claimed is:

1. An encoding method for a global disparity vector, the encoding method comprising:

determining global disparity vector prediction information and a global disparity vector of a current encoding region; and encoding information about the global disparity vector of the current encoding region and writing the information into a bit-stream as required, wherein the information about the global disparity vector of the current encoding region is used to determine the global disparity vector of the current encoding region by a decoder, wherein the determining the global disparity vector prediction information and the global disparity vector of the current encoding region comprises:

determining a global disparity vector prediction value of the current encoding region according to at least one from among global disparity vectors of N1 encoding regions at a same viewpoint which have been encoded prior to the current encoding region, N2 preset vectors, and N3 vectors calculated according to the global disparity vectors of the N1 encoding regions at the same viewpoint which have been encoded prior to the current encoding region, wherein N1, N2 and N3 are positive integers, and the N1 encoding regions at the same viewpoint are encoding regions which belong to a layer which is the same as or different from the current encoding region, and determining the global disparity vector of the current encoding region, and wherein the encoding the information about the global disparity vector of the current encoding region and the writing the information into the bit-stream comprises:

writing a flag bit indicative of an absence of difference information into the bit-stream if the global disparity vector of the current encoding region is the same as the global disparity vector prediction value, or otherwise, writing a flag bit indicative of a presence of difference information, and a difference between the global disparity vector of the current encoding region and the global disparity vector prediction value into the bit-stream.

2. The encoding method of claim 1, wherein the current encoding region comprises at least one from among a picture, a partial picture, a slice, a picture tile, a largest coding unit, a coding unit, and a macro block.

3. The encoding method of claim 1, wherein a result of deciding whether the information about the global disparity vector of the current encoding region is required to be written into the bit-stream is NO.

4. A decoding method for a global disparity vector, the decoding method comprising:

parsing a flag bit from a bit-stream, and parsing, from the bit-stream, a difference between a global disparity vector of a current decoding region and a global disparity vector prediction value if a result of parsing the flag bit indicates a presence of difference information;

determining global disparity vector prediction information of a current decoding region in the same way as on an encoding side; and determining the global disparity vector of the current decoding region according to the global disparity vector prediction information, wherein the determining the global disparity vector prediction information of the current decoding region in the same way as on the encoding side comprises:

determining the global disparity vector prediction value of the current decoding region in the same way as on the encoding side according to at least one from among global disparity vectors of N1 decoding regions at a same viewpoint which have been decoded prior to the current decoding region, N2 preset vectors, and N3 vectors calculated according to the global disparity vectors of the N1 decoding regions at the same viewpoint which have been decoded prior to the current decoding region, wherein N1, N2 and N3 are positive integers, and the N1 decoding regions at the same viewpoint are decoding regions which belong to a layer which is the same as or different from the current decoding region, and wherein the determining the global disparity vector of the current decoding region according to the global disparity vector prediction information comprises:

determining the global disparity vector of the current decoding region as the global disparity vector prediction value if the result of parsing the flag bit indicates an absence of difference information, or otherwise, determining the global disparity vector of the current decoding region as a sum of the global disparity vector prediction value and the difference.

5. The decoding method of claim 4 further comprising:

after determining the global disparity vector of the current decoding region, setting a global disparity vector of a corresponding decoding region in a layer different from the current decoding region at a same viewpoint as the global disparity vector of the current decoding region.

6. The decoding method of claim 4, wherein the current decoding region comprises at least one from among a picture, a partial picture, a slice, a picture tile, a largest coding unit, a coding unit, and a macro block.

7. The decoding method of claim 4, further comprising:

parsing, from the bit-stream, an index of a global disparity vector prediction value, wherein the determining global disparity vector prediction information of the current decoding region in the same way as on the encoding side further comprises:

determining a global disparity vector prediction value of the current decoding region according to the parsed index and a list of global disparity vector prediction candidate values which is the same as that on the encoding side.

8. A decoder comprising:

a processor, wherein the processor is configured to:

parse a flag bit from a bit-stream, and parse, from the bit-stream, a difference between a global disparity vector of a current decoding region and a global disparity vector prediction value if a result of parsing the flag bit indicates a presence of difference information, determine global disparity vector prediction information of the current decoding region in the same way as on an encoding side, and determine a global disparity vector of the current decoding region according to the information provided by the processor, wherein the processor is further configured to:

determine the global disparity vector prediction information of the current decoding region in the same way as on the encoding side by determining the global disparity vector prediction value of the current decoding region in the same way as on the encoding side according to at least one from among global disparity vectors of N1 decoding regions at a same viewpoint which have been decoded prior to the current decoding region, N2 preset vectors, and N3 vectors calculated according to the global disparity vectors of the N1 decoding regions at the same viewpoint which have been decoded prior to the current decoding region, wherein N1, N2 and N3 are positive integers, and the N1 decoding regions at the same viewpoint are decoding regions which belong to a layer which is the same as or different from the current decoding region, and determine the global disparity vector of the current decoding region according to the global disparity vector prediction information by determining the global disparity vector of the current decoding region as the global disparity vector prediction value if the result of parsing the flag bit indicates an absence of difference information, or otherwise, by determining the global disparity vector of the current decoding region as a sum of the global disparity vector prediction value and the difference.

* * * * *